Jan. 3, 1950     H. A. PEARSON     2,493,734
MAGNETIC INSERT EARPHONE INSERTABLE
IN THE EAR OF THE USER
Filed May 23, 1945     5 Sheets-Sheet 3
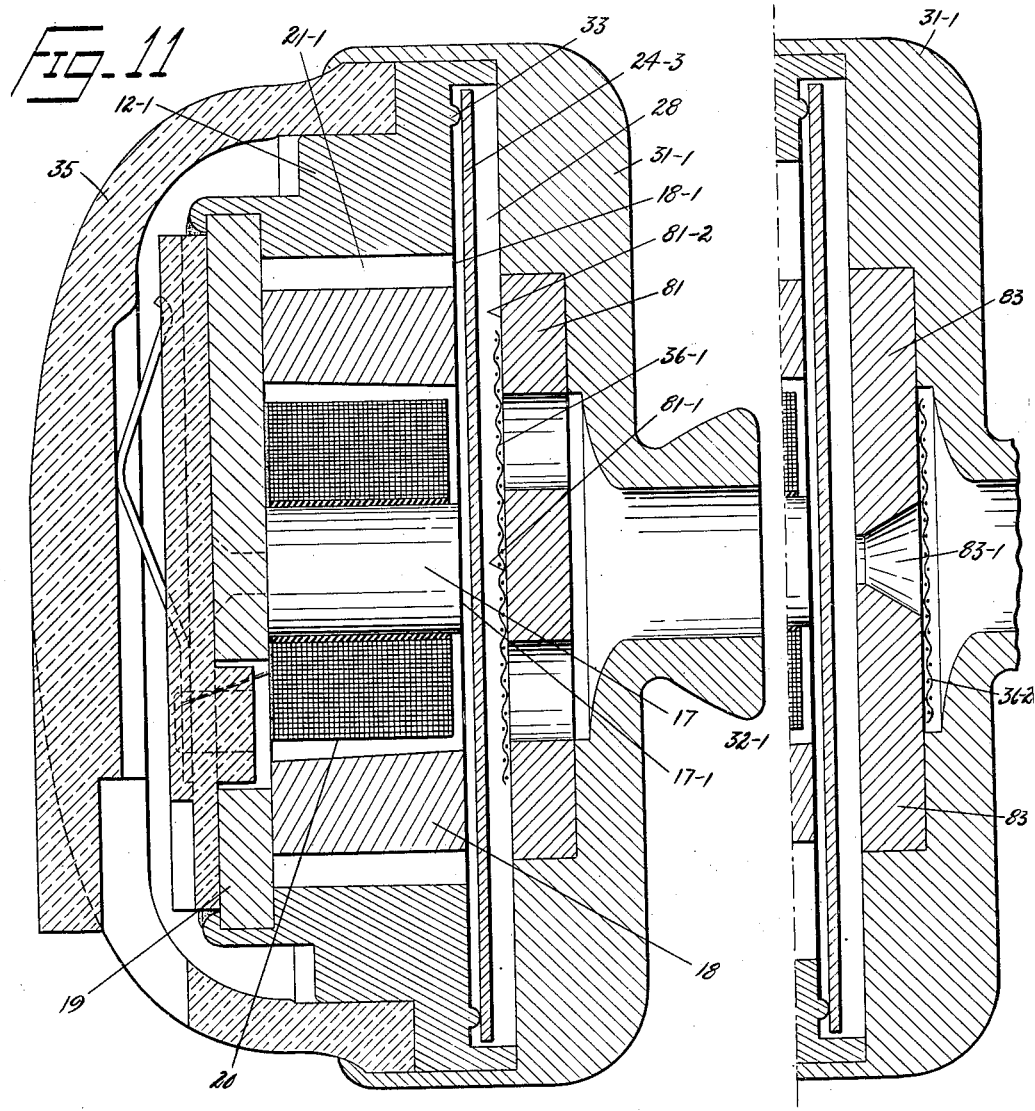
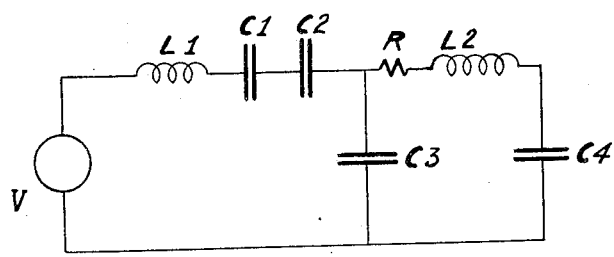
INVENTOR.
H. A. Pearson
BY
Attorneys Jan. 3, 1950  H. A. PEARSON  2,493,734
MAGNETIC INSERT EARPHONE INSERTABLE
IN THE EAR OF THE USER
Filed May 23, 1945  5 Sheets-Sheet 4

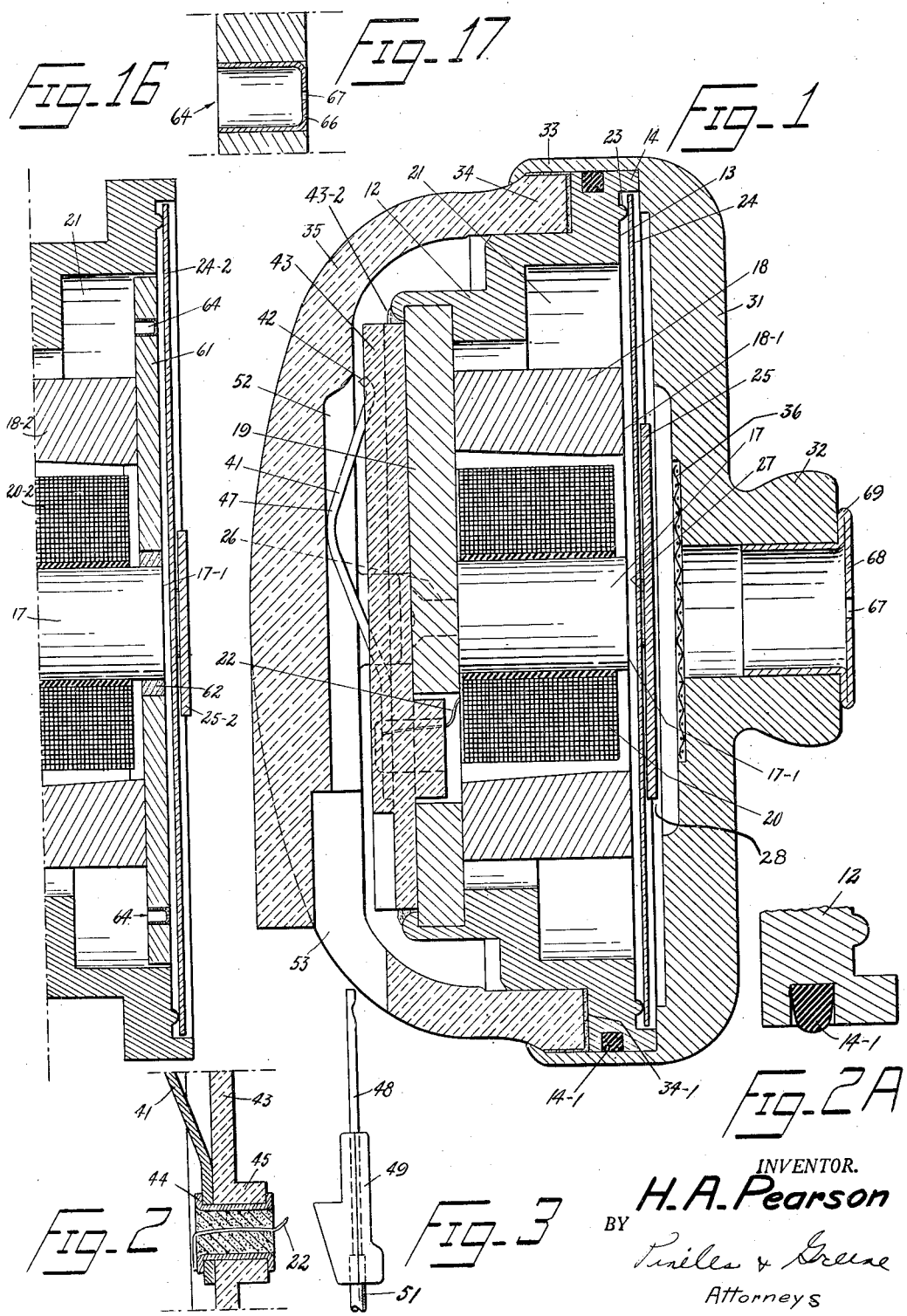

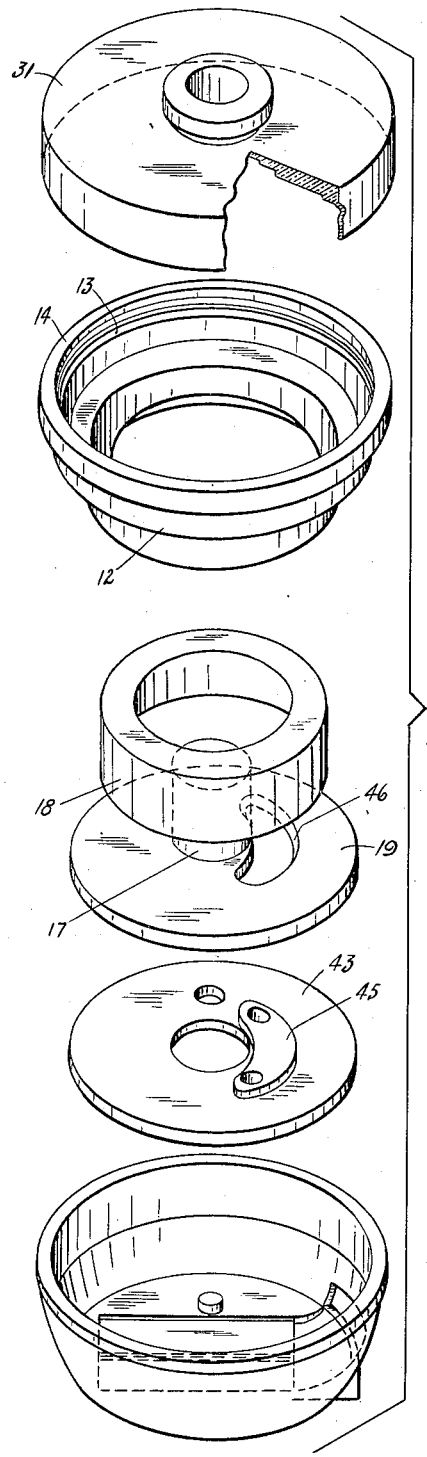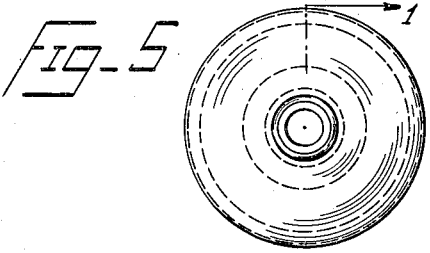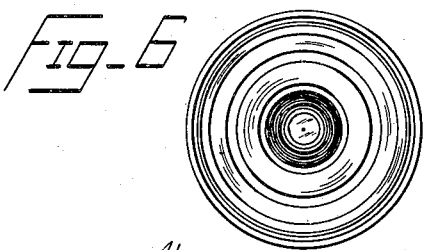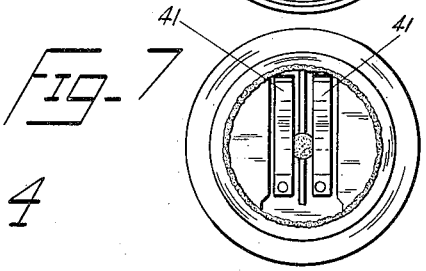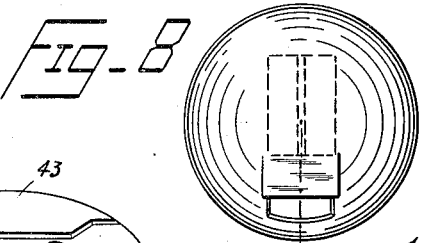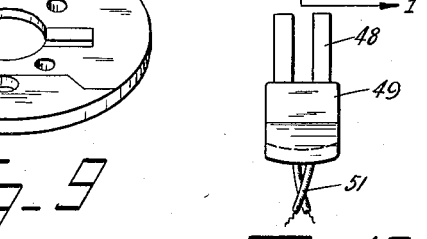

INVENTOR.
H. A. Pearson
BY
Pineles & Greene
Attorneys

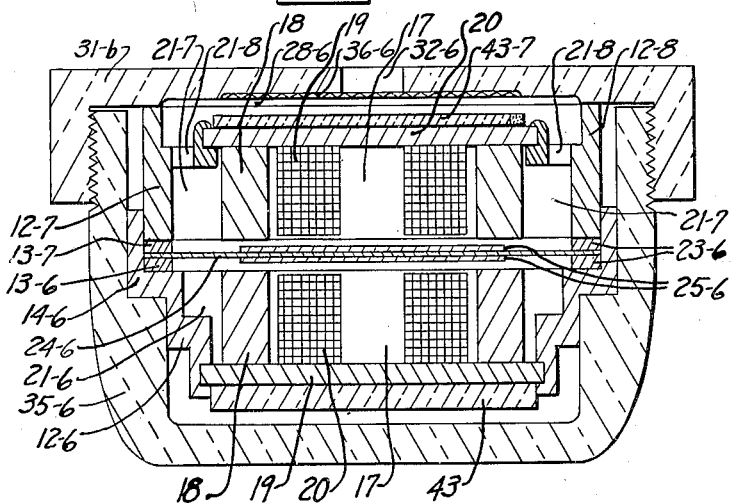
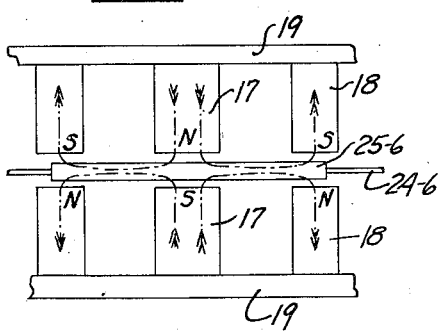

Patented Jan. 3, 1950

2,493,734

UNITED STATES PATENT OFFICE 2,493,734

MAGNETIC INSERT EARPHONE INSERTABLE IN THE EAR OF THE USER

Harry A. Pearson, Mount Vernon, N. Y., assignor to Sonotone Corporation, Elmsford, N. Y., a corporation of New York Application May 23, 1945, Serial No. 595,299

3 Claims. (Cl. 179—114)

This invention relates to insert earphones and more particularly to magnetic insert earphones small enough for insertion into the ear of the user and suitable for use in hearing aids.

Among the objects of the invention are magnetic insert earphones, all essential elements of which are of a simple, generally circular shape and concentrically arranged and generally designed and proportioned in such manner as to enable the manufacture and assembly of such device with great economy and without requiring skilled labor while assuring that they operate efficiently over a desired extended frequency range, and that, when assembled, all devices are substantially uniform in their response characteristics.

A distinct object of the invention is such magnetic insert earphone in which acoustic leakage from the acoustic spaces within the earphone is positively eliminated.

The foregoing and other objects of the invention will be best understood from the following description of exemplifications of the invention, reference being had to the accompanying drawings wherein Fig. 1 is a cross-sectional view of a miniature hearing aid receiver exemplifying the invention;

Fig. 2 is a detailed sectional view showing the mounting of a contactor terminal of the receiver of Fig. 1;

Fig. 3 is a side view of a plug terminal for the receiver of Fig. 1;

Fig. 4 is an exploded perspective view of the principal elements of the receiver of Fig. 1;

Fig. 5 is a top plan view of the receiver cap of the receiver shown in Fig. 1;

Fig. 2A is a detailed cross-sectional view of a rim portion of the aligning structure of Fig. 1 with the acoustic seal element thereof;

Fig. 6 is a top plan view of the same receiver with the cap and diaphragm removed;

Fig. 7 is a rear plan view of the same receiver with the casing wall broken away;

Fig. 8 is a rear plan view of the receiver;

Fig. 9 is a perspective view of the contact support of the receiver;

Fig. 10 is a plan view of the plug shown in Fig. 4;

Fig. 11 is a view similar to Fig. 1 of another form of earphone receiver exemplifying the invention;

Fig. 12 is an electric analog of the acoustic system formed by such receiver in the spaces of the ear cavity to which it is connected;

Fig. 15 is a view similar to Fig. 11 showing a modified construction of such receiver;

Fig. 16 is a view similar to Fig. 1 of a modified construction of such receiver of the invention;

Fig. 17 is an enlarged detailed sectional view of a damping element of the receiver of Fig. 16;

Fig. 18 is a view similar to Fig. 1 of another form of electro-acoustic transducer structure of the invention; and Fig. 19 is a simplified diagram of the principal elements of Fig. 18.

Figs. 1 and 3 to 11 show a midget insert earphone or hearing aid receiver exemplifying the principles of the invention.

Figure 13:
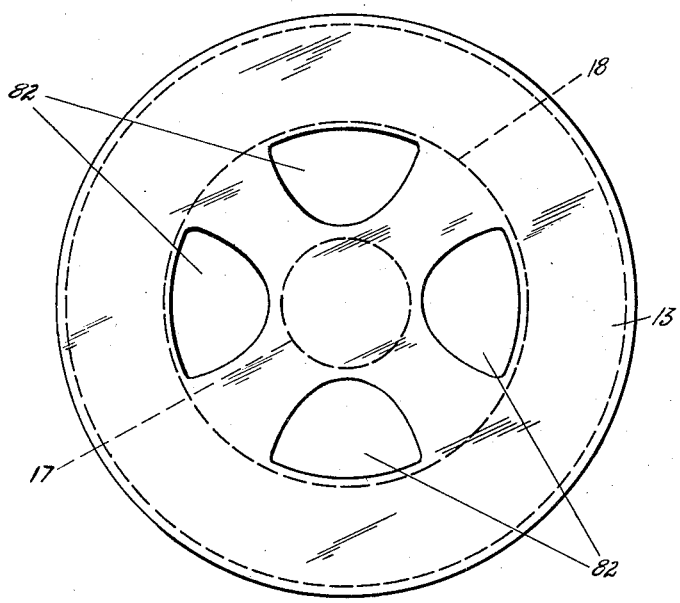
Fig. 13 is a plan view of the auxiliary magnet of the receiver of Fig. 10.

The receiver or earphone shown in Figs. 1 to 10 comprises an electro-acoustic transducer structure having its electro-magnetic elements supported by a circular frame or aligning member 12 which is shown formed of a cylindrical shell of metal, such as brass, having an enlarged circular diaphragm seating region 13 bounded by a flange 14. The electro-magnetic elements of the transducer structure consist of a substantially cylindrical central magnetic pole piece 17 and a surrounding substantially cylindrical ring-like outer magnetic pole member 18 held in their concentrical relationship by a substantially circular, concentric magnetic junction or yoke plate 19.

In the commercial construction of receivers of the type shown in Fig. 1, the outer cylindrical magnet pole 18 is formed of permanent magnet material, such as molded Alnico material, the inner surface of the cylindrical magnet 18 being shown in an exaggerated manner with a slightly conical surface to facilitate its removal from the mold. The cylindrical pole piece 17 and the circular yoke plate 19 are of soft highly permeable magnetic material. The circular periphery of the yoke plate 19 projects beyond the circular magnet 18 and it is seated in a cylindrical recess formed in the rear side of the mounting and aligning shell 12, a portion of the shell wall of reduced thickness which surrounds the periphery of the yoke plate being crimped or bent thereover so as to fix the yoke plate with the driving magnet secured thereto in its proper aligned position within the aligning shell 12.

In the generally cylindrical space extending between the pole piece 17 and the surrounding magnet 18 is located a coil 20 which constitutes the receiver winding carrying the electric variable frequency operating currents.

The circular region of the aligning shell which surrounds the front portion of the cylindrical magnet 18 is of larger diameter than the rear portion so as to provide a substantially circular acoustical cavity space 21 extending around the cylindrical magnet 18.

The circular region of the mounting shell 12 on which the seating surface 13 is formed is of greater diameter than the other portions of the mounting shell and it has formed on its seating surface 13 a continuous, generally circular, outwardly curved seating ridge 23 against which a peripheral region of the inner side of a receiver diaphragm 24 rests. The central part of diaphragm 24 is arranged to serve as a magnetic armature for cooperation with the pole surface portions 17—1, 18—1 of the magnetic driving structure so that the diaphragm shall be vibrated by the vibratory magnetic forces exerted thereon by the driving structure.

The diaphragm 24 may be made of non-magnetic or of magnetic material. The central armature portion of the diaphragm 24 has secured thereto an additional circular armature element 25 of highly permeable magnetic material so as to provide it with the required magnetic cross-sectional area for carrying all the magnetic flux passing through it from the core structure formed of the pole members 17 and 18 without substantially saturating the central armature portion of the diaphragm. If the diaphragm 24 is made of non-magnetic material, the armature 25 has to be made of a sufficient thickness so as to provide the required cross-sectional magnetic core area for all the flux traversing the gaps without saturating the armature.

The central piece 17 is secured to the center of the yoke plate 19 either by spot welding, soldering or by providing it with a circular rivet projection 26 which is inserted in a central hole of the yoke plate 19 and riveted in place in the manner indicated.

The circular permanent magnet 18 surrounding the pole piece 17 is secured to the yoke plate 19 by spot welding or soldering. The central portion of the additional armature element 25 is affixed to the diaphragm 24 by spot welding or soldering.

A circular cap or cover wall 31 overlying the outer side of the diaphragm 24 and provided with a sound outlet duct or nipple 32 has a circular seating surface engaging the circular flange 14 of the aligning member. The cap 31 is shown provided with a cylindrical rim 33 extending over and engaging the cylindrical outer surface of the seat region of the aligning member 12 and the adjoining flanged rim 34 of a casing 35 enclosing the rear side of the receiver. The edge portion of the cap rim 33 is shown crimped over the flanged rim 34 of the casing 35 for securing the cap wall 31 and the casing 35 in their fixed positions shown to the circular rim region of the rigid circular aligning member 12. The inner side of the cover or cap wall 31 facing the diaphragm is recessed to provide an acoustic cavity space 28 facing the outer side of the diaphragm.

A sheet of acoustically pervious acoustic resistance material, such as thin fabric screen 36 is placed across the passage of the outlet duct 32 for dampening undesirable peaks of the sound output.

The ends of coil windings 20 are shown connected to two flat contact terminal springs 41. As shown in detail in Fig. 3, one end of each spring 41 is secured to an underlying supporting disk 43 by a hollow rivet 44 of conducting material, such as brass. As indicated in Figs. 1, 3, the terminal supporting disk 43 is made of an insulating material, such as synthetic resin material, and is provided with a thickened boss-like portion 45 having formed therein two holes for receiving the rivets 44 which hold affixed thereto the two contact spring terminals 41. The yoke plate 19 is shown provided with an opening 46 for receiving the boss projection 45 of the insulating terminal supporting disk 43. This arrangement facilitates threading of the two end leads 22 of the coil through the hollow rivets 44 which hold affixed the two terminal springs 41 to the supporting disk 43 so that by soldering the two end portions of the two leads 22 to the rivets 44 or to the contact springs 41, or to both, a good electrical connection between the spring contacts 41 and the coil is secured.

As indicated in Figs. 1, 8, and 10, each contact terminal spring 41 is made of a flat metallic strip which is bent flat-wise to provide an intermediate contact projection 47 which is biased in outward direction for engagement with a flat metallic contact prong 48 of a two-prong plug 49 provided at the end of a cord 51 through which the receiver coil is connected to its operating circuits.

The inner side of the rear wall of the casing 35 facing the two contact springs 41 is provided with elongated grooves or recesses 52 extending in the direction of the contact springs 41 and overlying the same, and the two grooves 52 are arranged so as to guide the flat contact prongs 48 of the plug 49 when they are inserted through a side hole 53 of the casing into engagement with the contact springs 41.

The portions of insulating supporting disk 43 which face the two grooves 52 of the casing wall are likewise provided with two elongated guide grooves 54 along with the two contact springs 41 are mounted for guiding the free end 42 of each spring 41 as it is being deformed and flexed by the plug prongs 48 of the contact plug 49 when they are inserted through the casing opening 53 into contact engagement with the two contact springs 41.

The front region of the aligning shell 12 which supports the diaphragm 24 is made substantially wider than the diameter of the outer circular magnet 18 so as to provide between the outer surface of the circular magnet 18 and the facing inner surface of the shell 12 an acoustical cavity or chamber having a stiffness which is more than about one tenth of the dynamic stiffness of the diaphragm.

The space between the circular pole piece 17 and the surrounding circular magnet 18 is so proportioned as to provide space for a winding coil 20 which has a figure of merit or Q in the range of about 5 to 1, but not more than about 10 to 1. As used herein, the figure of merit or Q of a coil is a constant which defines the ratio of the reactance of the coil to its D. C. resistance at the geometric mean frequency band over which the coil has to operate.

There are two ways along which a receiver of the type described above may be designed. In one type, the magnetic armature 25 of the diaphragm is made of such diameter that the pole face area 18—1 of the outer magnet 18 which is overlapped by the armature 25 is of the same order magnitude as the pole face area 17—1 of the central pole piece. In the other type, the armature is given a larger diameter so that the pole face area 18—1 of the outer magnet overlapped by the armature 25 is several times the pole face area 17—1 of the central pole piece 17.

If the pole face area 18—1 of the outer magnet 18 overlapped by the armature 25 is of the same order of magnitude as the central pole face area 17—1, the inner pole piece as well as the outer magnet operate essentially as a two pole structure, and the length of the permanent magnet must be sufficient to force a magnetic flux of the required density through the two air gaps lengths, namely the air gap between the central pole face 17—1 and the armature 25 and the air gap between the outer pole face 18—1 and the armature 25. However, such receivers are relatively critical in their adjustment since slight misalignment of the diaphragm disturbs their performance.

On the other hand, if the pole face area 18—1 of the outer magnet 18 overlapped by the armature 25 is substantially larger than the pole face area 17—1 of the inner pole piece, the receiver operates essentially as a single pole or homopolar structure and such receivers do not present any such critical difficulties and they are therefore preferable.

The receiver shown is of the latter type, and the principal pull or forces acting on the diaphragm are exerted thereon by the central pole 17, the pole area 17—1 of which is several times smaller than the pole area 18—1 of the outer magnet 18 overlapped by the armature 25. As a result, the receiver of the type shown can operate with a shorter permanent magnet length, it being merely necessary to make the permanent magnet sufficiently long to induce the required flux density through the air gap extending between the central core or pole piece 17 and the facing armature portion, since the magneto-motive force required to return the flux through the annular gap between the armature and the outer core member 18 is only a fractional part of that required for forcing the flux through the air gap facing the central pole member 17. As a result, the response of such receiver is not affected by slight misalignment of the central armature portion of the diaphragm in relation to the pole faces 17—1, 18—1 of the circular pole members 17, 18.

In other words, receivers of the invention described above—having an armature 25 which overlaps the pole face of the outer magnet 18 over an area of the order of twice or more than the pole area 17—1 of the central pole piece 17—will not exhibit substantial differences in their performance characteristics notwithstanding slight misalignment of the diaphragm armature 25 such as would occur in normal production methods.

In the receiver of the invention the diaphragm is floatingly held in its operating position against the seating ridge 23 and is maintained therein during operation solely by the magnetic forces which are exerted on the central portion of the diaphragm by the elements of the magnetic core structure. Furthermore, the raised circular surface region of the seating ridge 23 is adjoined by recessed inner and outer circular surface regions arranged to give the portion of the ridge facing the diaphragm a curved convex cross section which is so shaped that in all operating positions of the vibratory diaphragm a raised circular region of the seating ridge maintains engagement with a continuous peripheral region of the diaphragm throughout the normal range of its vibratory amplitudes.

A certain minimum ratio between the cross section area of the outer permanent magnet 18 and the central core is required in order to make sure that the strong A. C. current transversing the coil 20 does not produce any material demagnetization of the permanent magnet 18. Demagnetization of a permanent magnet may be avoided by making it sufficiently long, in the direction of the induced magnetic flux lines, so as to assure that a high demagnetizing force has to be exerted by the A. C. coil current for effecting such a demagnetization of the permanent magnet.

In the receiver of the invention demagnetization of the outer permanent magnet 18 is made impossible in a much more effective way, namely by providing it with a cross-sectional area, in a direction transverse to the direction of the flux lines, sufficiently larger than the corresponding cross-sectional area of the central pole piece so that the maximum A. C. flux that can be induced in the central pole piece or core 17 without saturating it is not sufficient to materially demagnetize the outer permanent magnet 18.

In a practical midget hearing aid receiver of the type described, a permanent magnet 18 having a length of the order of one eighth to about one quarter of an inch in the direction of the flux lines is sufficient to maintain in the armature gap facing the central pole piece 17 the desired flux density of about 8,000 lines per square centimeter when operating with an average gap of the order of about .005''. Such receivers may be readily designed to operate with an air gap of a length of the order of about 3 to 6 mils.

The cross-sectional area of the outer magnet 18 in a direction transverse to the flux lines is made about four times the cross-sectional area of the pole piece or core if a permanent magnet material, such as Alnico 2, is used. When using a magnetic material, such as Alnico 5, the cross-sectional area of the outer magnet 18 may be correspondingly reduced.

Due to the fact that all essential operating elements of the receiver, namely the magnet core elements, the armature and diaphragm, the coil, and the acoustic cavities are all of simple and circular shape and coaxially arranged and the fact that the magnetic vibratory forces are exerted only on the central circular armature portion of the diaphragm, such receivers may be manufactured with normal production methods at reduced cost and they are readily assembled by workers of little skill into receivers which operate with a high efficiency over the desired frequency range with an unusually high degree of uniformity never approached in the prior art receivers.

In the receiver of the invention, the acoustic cavity 21 extending on the inner side of the diaphragm—and which is a controlling factor in determining its frequency response—extends outside the space occupied by the magnetic core structure, and this cavity 21 is of a generally uniform circular shape arranged co-axially with the other circular elements of the receiver. This makes it possible to keep the physical dimensions of the acoustic chamber within closely controlled limits and thereby assure that the response characteristics of the receivers are uniform.

The circular shape and coaxial arrangement of the elements of the magnetic system, of the receiver diaphragm, and of the acoustic cavity assure that the diaphragm vibrates in a predictable symmetrical mode, free from spurious higher modes which occur in receiver structures lacking substantially uniform axial symmetry.

Another advantage of the receiver arrangement of the invention resides in the fact that it uses only one operating coil, the winding turns of which are of circular form, because such coils have the highest Q or figure of merit for a given impedance.

The circular and coaxial arrangement of all the structural elements of the receiver simplifies also the problem of joining the portions of the receiver elements so as to provide an acoustic seal between the acoustic cavity 21 of the receiver structure and the back space between the receiver casing 31 and the rear side of the mounting structure 12 which holds the receiver elements in their aligned operative positions. Thus, in the receiver of the invention, the acoustic seal between the rear side of the mounting shell 12 and the magnetic core elements of the receiver structure is provided along the simple circular junction surfaces along which the yoke plate 19 is joined to the rear side of the shell 12.

When a hearing aid receiver of the type shown is used with a high gain hearing aid amplifier worn on the body of the user, whistling may occur due to acoustic leakage feedback from acoustic spaces of the receiver to the hearing aid microphone. Such acoustic leakage feedback may take place from the inner spaces of the receiver facing the inner side of the diaphragm as well as from the outer spaces of the receiver facing the outer side of the diaphragm. Leakage from the inner receiver spaces through the rear side of the receiver structure is positively prevented in the receiver of the invention by the good acoustic seal formed along the circular junction surfaces between the peripheral region of the yoke plate 29 and the circular rear side of the mounting shell 12 which is crimped over the yoke plate.

The acoustic seal on the rear side of the receiver structure is completed by filling the space of the hollow rivets 44—which secure the terminal springs 41 to the supporting discs 43—in the manner shown in detail in Fig. 3, with a cementitious synthetic resin material, the acoustic seal being further safe-guarded by the layer of cement with which the contact supporting disc 43 is held affixed to the rear side of the yoke plate 19, the layer of cement filling also the spaces 43—2 between the periphery of the circular supporting disc 43 and the crimped-over rear end region of the mounting shell 12.

Acoustic leakage from the inner and outer acoustic spaces of the receiver along the junction surfaces between the cap well 31 and the shell is prevented by coating the interfaces 34—1 of the junction region 34 of the receiver casing and the mounting shell 12 with a stable viscous material, such as silicon grease, so that when they are secured to each other in the manner shown in Fig. 1, by crimping thereover the cylindrical rim 33 of the cap wall 31, the viscous grease will enter and fill all leakage paths that might develop along the junction surfaces between the rim of the aligning shell 12 and the rim 33 of the cap well 31. In addition, the cylindrical flange region 14 of the shell may be provided with an annular recess 14—1 in which is placed a yieldable packing member, such as a ring of synthetic rubber, which is yieldingly engaged by the inner face of the cylindrical rim of the cover wall 31 so as to form therewith a positive acoustic seal which prevents acoustic leakage along the junction surfaces between the shell and the rim 33 of the cap wall 31.

Because of their special characteristics, the receivers of the invention may be designed for operation with any practically desired frequency response characteristics. For instance, if it is desired to design such receiver for operation with a frequency which is substantially uniform over a frequency range up to about 4,000 cycles, it is merely necessary to place a simple circular barrier separating the space of the acoustic chamber 21 from the facing peripheral region of the diaphragm and to provide a barrier with a number of acoustic openings arranged in a uniform circular symmetrical pattern for giving the diaphragm the desired vibration characteristics.

It has been found that rather large variations in the thickness of the diaphragm of such receivers have apparently no marked effect on their sensitivity or frequency response. It is commonly thought that the stiffness of the diaphragms of such receivers depends directly on the cube of the thickness of the diaphragm. Nevertheless, it was found that as long as the ridge 23 which supports the diaphragm has such a height or diameter that under the influence of the permanent magnetic forces the diaphragm comes to equilibrium at a prescribed air gap spacing relatively to the pole faces of the driving structure, receivers having diaphragms of substantially different thickness operate with substantially the same sensitivity and frequency response.

It is believed that this is due to the fact that the dynamic stiffness of the diaphragm is dependent on the dish-like deformation imparted to the diaphragm by the uni-directional magnetic forces exerted thereon by the driving magnet structure. This deformation is greater for thinner diaphragms and smaller for thicker diaphragms. The increase in stiffness that is caused by making the diaphragm thicker is thus neutralized by the fact that it is subjected to a smaller deformation under the action of the uni-directional magnetic forces exerted thereon by the driving magnet so that as an overall effect, diaphragms of thicknesses differing within a limited range, exhibit a substantially uniform dynamic stiffness as long as they are supported by a ridge of such height or diameter as to assure that the armature portion of the diaphragm has substantially the same air gap spacing from the pole faces when it is deformed by the uni-directional magnetic forces of the receiver acting thereon.

As disclosed in the copending application of William F. Knauert, Serial No. 521,007, filed February 4, 1944, now Patent No. 2,449,557, issued September 21, 1948, by controlling the tool with which the diaphragm supporting ridge 23 is machined so that, depending on the thickness of the diaphragm, the height of the ridge 23 or its diameter is correspondingly modified, it is possible to assure that diaphragms of different thickness will operate with substantially the same gap spacing between the armature and the pole face of the magnetic driving structure, thereby assuring that, notwithstanding the differences in the diaphragm thickness, all receivers are substantially uniform in their frequency response.

In Fig. 11 is shown another form of receiver of the invention designed for operation with a good frequency response extending up to about 4,000 cycles per second. It has the same circular pole piece 17, circular permanent magnet 18 and yoke plate 19 and an actuating coil 20 as the receiver of Fig. 1, all held in their operative position by a similar circular aligning or frame member 12—1 supporting on a circular seating ridge 23 a diaphragm 24—3. The circular aligning frame member 12—1 is shaped so as to provide back of the diaphragm 24—3 a circular acoustic cavity 12—1 of lesser volume than the corresponding acoustic cavity 21 of the receiver of Fig. 1.

The diaphragm 24—3 is made of a magnetic sheet material of high magnetic permeability, such as Permendur, and is of sufficient thickness so that its central magnetic armature region facing the pole faces 17—1 and 18—1 of the concentric pole members 17 and 18 shall be able to carry all the magnetic operating flux without saturation of the material. Although such diaphragm, because of its greater thickness has a greater stiffness than the diaphragm provided with an armature in the manner shown in Fig. 1, its dynamic stiffness when used in the receiver will be of substantially the same magnitude as in the case of the diaphragm of the receivers shown in Fig. 1 if it has the same gap spacing from the pole faces of the pole members 17, 18 when it is subjected to the uni-directional magnetic forces of the polarizing flux acting thereon. Instead of operating with a diaphragm without a distinct armature, the receiver of Fig. 11 may be designed for operation with a diaphragm provided with an additional armature, such as shown in Fig. 1.

The receiver of Fig. 11 has a circular cap or cover wall 31—1 and the casing 35 arranged as in the receiver of Fig. 1, the shoulder portion 14 of the frame structure and cover wall 31 being so proportioned as to provide between the outer side of the diaphragm and the facing side of the cover wall 31—1 an outer acoustic cavity space 28—1 which opens into the sound passage of the outlet duct 32—1 of the cover 31—1. A damping resistance screen 36—1 is placed across the passage of the sound outlet duct 32—1, as in the receiver of Figure 1.

When such receiver is used as a part of a hearing aid with the sound outlet duct connected through a sealed passage of an ear insert to the sealed-off ear canal, the acoustic system formed by the elements of the receiver and the ear cavity may be represented approximately by an electric analog shown in Fig. 12. In this analog, the voltage V represents the magneto-motive vibratory forces acting on the diaphragm, the inductance L—1 the effective mass of the diaphragm, the condenser C—1 the stiffness of the diaphragm, the condenser C—2 the stiffness of the inner acoustic cavity space 21—1, the condenser C—3 represents the stiffness of the outer acoustic cavity space 28—1 of the receiver and R the damping resistance of the screen. The additional inductance L—2 and condenser C—4 of the analog of Fig. 12 represent approximately the acoustic inertance and acoustic stiffness of the ear cavity space to which the outlet duct of the receiver is connected. In order to give the receiver a good frequency response up to about 4,000 cycles, the inner acoustic cavity 21—1 of the receiver is proportioned so that it has a stiffness of the order of the stiffness of the diaphragm or up to about three times greater stiffness. Furthermore, the cavity space 28—1 on the outer side of the diaphragm 24—3 is designed to be stiff enough so that, when it is coupled to the ear canal through the passage of a conventional ear insert, it will form with the acoustic spaces of the ear canal an acoustic system having a resonant frequency in the range of 4,000 cycles are presented by elements C—3, L—2 and C—4. However, since the acoustic compliance C—4 of the ear cavity is very large, it may be neglected so that only the effective acoustic inertance of the ear cavity L—2 has to be considered in designing the outer acoustic cavity space 28—1.

In electroacoustic transducers of the magnetic type, such as in telephone receivers of the type shown, the useful force effective across the magnetic gap between the diaphragm and the electromagnetic core structure is a function of the constant uni-directional magnetic polarizing flux across the magnetic gap and of the variable magnetic flux acting across the magnetic gap. The variable flux acting across the gap is determined by the alternating current permeability of the diaphragm and the associated magnetic gaps. The alternating current permeability of the diaphragm or armature portion of an electro-acoustic-transducer of the invention may be materially increased by placing adjacent to the outer side of the diaphragm armature portion an auxiliary permanent magnet 81 of circular shape arranged so as to produce in the radial direction of the armature portion of the diaphragm a constant uni-directional flux opposite in direction to that produced by the circular polarizing magnet 18 without substantially decreasing the magnetic flux across the gap between the armature portion of the diaphragm and the electromagnetic core structure of the receiver.

According to the invention, the cover wall 31—1 of the receiver is utilized for supporting an auxiliary permanent magnet 81 adjacent the outer side of diaphragm 24—3 in the manner indicated in Fig. 10 so that the gap spacing between the auxiliary magnet 81 and the diaphragm 24—3 shall be substantially larger than the effective gap spacing between the diaphragm and the concentric pole members 17, 18 when the diaphragm is subjected to the uni-directional polarizing flux in its dished normal operating position.

Figure 14:
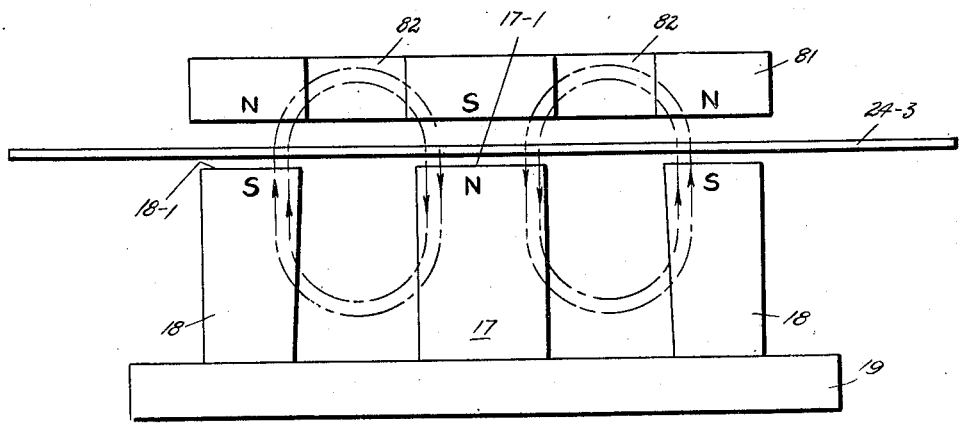
Fig. 14 is a simplified diagrammatic view of the magnetic elements of the receiver shown in Fig. 11.

In the receiver shown in Fig. 11, the cover wall 31 is provided on its inner side with a circular recess of a depth sufficient to receive therein the circular auxiliary permanent magnet 81. The permanent magnet 81 is suitably retained in the recess of the wall 31—1, as by cement. The auxiliary magnet 81 is permanently magnetized so that it has on the side facing the outer side of the diaphragm 24—3 pole faces 81—1 and 81—2 substantially facing the concentric pole faces 17—1, 18—1 of the magnetic core members 17, 18 and of a polarity opposite to that of the juxtaposed pole faces 17—1, 18—1. In other words, as indicated diagrammatically by N, S, in Fig. 14, the auxiliary magnet 81 is so polarized in relation to the polarization of the magnetic core structure 17, 18 that the combined actions of the main permanent magnet member 18 and of the auxiliary permanent magnet member 81, produce a uni-directional magnetic flux which continues in the same direction from the circular permanent magnet 18 through the pole piece 17, and its pole face 17—1 across the inner gap and the central armature portion of the diaphragm 24—3 through the outer gap toward the central circular pole face 81—1 of the auxiliary permanent magnet member 81, thence radially toward the outer circular pole face 81—2 of the permanent magnet member 81, thence back across the outer gap and perpendicularly through the facing peripheral region of the diaphragm 24—3 and the inner gap, to the face 18—1 of the circular permanent magnet member 18.

The gap spacing between the auxiliary magnet 81 and the armature portion of the diaphragm 24—3 is sufficiently greater than the gap spacing between the diaphragm and the pole faces of the core structure 17, 18, and they are so proportioned and correlated, that the variable flux in the magnetic circuit formed by the magnetic core members 17, 18 and the facing armature portion of the diaphragm is not reduced by the auxiliary permanent magnet member 81.

As shown in Figs. 11 and 13, an acoustic passage between the outer acoustic cavity 28—1 and the outlet duct 32—1 of the receiver cap 31—1 is provided by forming in the permanent magnet member 81 a plurality of symmetrically arranged acoustic apertures 82 extending through portions of the magnet member 81 located beyond the region of its pole face 82—1 facing the inner pole member 17.

In Fig. 15 is shown a receiver similar to that of Fig. 10 but utilizing a modified form of auxiliary magnet 83 held by the cap wall 31—1 opposite the outer side of the armature portion of the diaphragm 24—3. The auxiliary magnet 83 of Fig. 14 has only one central circular aperture 83—1 providing an acoustic passage connection between the outer acoustic cavity space 28 of the receiver and the outlet duct 32. The aperture 83—1 is of an outwardly tapered circular shape so that the side of the auxiliary magnet 83 facing the pole piece 17—1 of the central pole member 17 shall effectively coact therewith to cause the polarizing flux induced by the permanent core member 18 and the auxiliary magnet 83 to pass directly from the pole face of the core member 17 to the central pole face region of the auxiliary magnet 83 in the manner generally indicated by the magnetic flux lines in Fig. 14 without radially traversing the armature portions of the diaphragm.

Fig. 16 shows the principal elements of a receiver of the invention design for operation with a frequency response extending to about 4,000 cycles per second. The circular permanent magnet member 18—2 and its circular coil 20—2 are somewhat shorter. A circular magnet plate 61 is affixed, as by spot welding, to the side of the ring magnet 18—2 facing the diaphragm so that the outer side of the magnet plate 61 provides a pole face which is aligned substantially in the same plane as the pole face 17—1 of the central pole piece 17. This makes it possible to use a diaphragm with a smaller armature and having a higher resonant frequency than in the receiver of Fig. 1.

The outer region of the pole plate 61 serves as acoustic barrier separating the space of the acoustic chamber 21 from the peripheral region of the diaphragm 24—2. A suitable non-magnetic acoustic barrier material, such as synthetic resin material, is also placed, as by cementing, in the gap 62 separating the inner periphery of the pole plate 61 from the inner pole piece 17 so as to seal off the space occupied by coil 20—2. The outer region of the circular pole plate 61 which serves as an acoustic barrier is provided with a row of acoustic openings or vents 64 in which, or over which, are placed acoustic damping elements 66 the acoustic resistance of which is effective in suppressing undesirable peaks in the frequency response.

As indicated in the enlarged detail view, Fig. 17, the acoustic damping elements 66 placed in the openings 64 of the acoustic barrier 61 are formed of relatively thin hard sheet material, such as metal, and they are placed so as to plug up the cavity 64 and provide an acoustic passage only through a small opening or hole 67 formed in the sheet element 66. In order to give the thin sheet structure of such acoustic resistance or damper elements 66 mechanical strength and stability, they are given the form of a short cylinder with a dome of the sheet material closing one end of the cylinder and having formed therein the opening passage 67, and this shape facilitates the insertion and removal of the resistance elements from the openings in which they are mounted. If such acoustic resistance element is to be mounted in an opening, such as in the outlet duct 32 of a receiver, the dome region of the acoustic resistance element 68 may be formed so as to provide it with a protruding flange 69, in the manner shown in Fig. 1, the edge of which may be readily reached for removing the resistance element 68 from its mounting position.

In general, the thickness of the material of such acoustic resistance or damper element is so chosen that the ratio of the diameter of the opening 67 to the thickness is large, for instance of the order of 3 to 1 or more. The diameter of the opening 67 should be small enough to furnish the required acoustic resistance and it should be about three or more times greater than the thickness of the edge of the sheet material bordering the opening 67 in order that the opening 67 shall constitute an acoustic resistance and not an acoustic inertance.

In general, the thickness of the material and the size of the hole of such damping element 66 may be readily proportioned to provide the magnitude of acoustic resistance desired for the particular acoustical system in connection with which it is to be used. For instance, in a hearing aid midget receiver which is held in the ear of the user by an insert, an acoustical resistance of the order of about 500 ohms is desirable in the outlet duct 62 of such a receiver in order to dampen the undesirable resonant peaks. A damper element 66 of sheet metal, such as brass, about .003 inch thick, and having a substantially circular opening 67 about .015 inch in diameter will provide such desired acoustic resistance of about 500 ohms.

If a telephone receiver is to be connected to the ear canal by a tube of substantial length which has enough acoustic loss, a damper element 66 with a smaller acoustic resistance, such as 100 to 160 ohms will be sufficient for damping the usual resonant peaks of the diaphragm. A damper element of sheet metal which is about .008 inch thick and has an opening of the order of .025 inch diameter will provide such acoustic resistance of about 100 to 150 ohms. Such acoustic resistance element 66 of the invention has in general the same acoustic propagation characteristics at its opening 67 as a tube having a cross section of ⅓ square centimeter and which is long enough so that it does not resonate over the frequency range of the sounds which are to be transmitted through it. Accordingly, the simple stable acoustic resistance elements of the invention may be readily used in acoustic transmission systems of telephone receivers and similar devices and they do not materially modify the acoustic characteristics of the system except for the intentional damping resistance of the order of 100 to 500 ohms which is desired in order to suppress undesired peaks.

Such acoustic resistance elements of the invention are also very effective as barriers for preventing entry of liquid, such as rain, or generally water, into acoustic spaces of devices such as telephone receivers.

In case of telephone receivers which form part of equipment of combat personnel and which have to be used in all kinds of weather, it is essential to prevent entrance of rain or generally water and liquids into the acoustic passage of the receiver. Although many attempts have been made in the past to provide telephone receivers and like acoustic devices with seals which would permit acoustic propagation through passages closed by the seal but prevent entrance of liquid beyond the seal, no practical seals that could be used in such devices have been available heretofore.

The acoustic resistance of the invention is very effective not only as an acoustic resistance which dampens undesired resonant peaks but also in preventing water and other liquids from entering into acoustic passages over which it is placed while permitting a substantially unobstructed propagation of the desired acoustic waves through the passage which it seals. This is due to the fact that because of the small size of the passage opening 67 of the acoustic resistance element of the invention, the surface tension of a water globule overlying the passage opening 67 is larger than the weight of a column of water that may enter the acoustic passage of the receiver structure bounded by the acoustic resistance element of the invention.

According to one phase of the invention, an electro-acoustic device of the push-pull magnetic-armature type is provided by arranging on the opposite sides of a central armature portion of the vibratory diaphragm two circular electromagnetic core structures, each core structure including a substantially circular inner pole member and a surrounding substantially concentric circular outer member and windings located in the space between the inner and outer pole members, the concentric pole members being aligned in juxtaposition on the opposite sides of the armature portion of the diaphragm and each core structure including permanent magnet elements polarized so that juxtaposed pole faces of the two core structures are of unlike polarity, the windings of the two core structures being connected so that an alternating voltage impressed on the windings produces a corresponding vibratory motion of the diaphragm, and that a vibratory motion imparted to the diaphragm produces corresponding voltages in the two windings.

Figs. 18 and 19 show one form of such electro-acoustic device of the push-pull magnetic armature type exemplifying the invention. It comprises a vibratory diaphragm 24—6 similar to that of Fig. 1, but having secured to its central portion two alike additional circular armature elements 25—6, for instance, by electrically spot welding a central circular surface element of each armature to the diaphragm. Alternatively, the diaphragm may be made of magnetic material of the required thickness so as to provide at its center an armature region of the required cross section, in a manner analogous to the armature of Fig. 11.

Two electromagnetic core structures, each having a central circular pole member 17 and a surrounding outer circular permanent magnet member 18 and an actuating coil 20 surrounding the inner pole member 17, similar to the corresponding elements of Fig. 1, are held on the opposite sides of the diaphragm 24—6 so that the concentric pole faces of the pole members of the two core structures are aligned in juxtaposition on the opposite sides of the central armature region of the diaphragm 24—6.

As shown in Fig. 18, the elements of one core structure are held in their proper operative position by an aligning structure 12—6, similar to the aligning structure 12 of Fig. 1. The elements of the core structure located on the opposite sides of the diaphragm are similarly held mounted in their operative position by a modified form of circular aligning shell structure 12—7. As shown in Fig. 18, the diaphragm 24—6 with its armature portions 25—6 are held in properly spaced relation with respect to the pole faces of the core structure by two circular spacer washers 23—6 interposed between the periphery of the diaphragm and the circular seating surfaces 13—6, 13—7 formed along the facing peripheral regions of the two aligning members 12—6, 12—7 of the two core structures. This arrangement makes it possible to grind the aligning surfaces 13—6, 13—7 of each aligning structure level with the pole faces of the inner and outer core member. Alternatively, each seating surface 13—6, 13—7 of the two aligning members may be provided with a projecting seating ridge 33 similar to the seating ridge of Fig. 1, for assuring proper spacing of the armature diaphragm from the pole faces of the core structure.

As shown in Fig. 18, proper aligning of the core structures is simplified by providing the two aligning members with aligning surfaces arranged so as to automatically align the several structures in their operative position when assembled. In the form shown, the aligning surfaces are formed by the inner surface of a cylindrical flange 40—6 extending from one of the aligning members, in the case shown from the aligning member 12—6 of the inner core structure, shaped to interfit with a cylindrical aligning surface formed by the exterior surface of the aligning member 12—7 of the other core structure as well as with the periphery of the diaphragm 24—6 and the spacer washers 23—6.

The assembly of the diaphragm and the two push-pull arranged core structures are shown enclosed in a casing 35—6 provided with a threaded cover 31—6 having a sound passage opening 32—6. The aligning member 12—7 of the outer core structure which adjoins the cover wall 31—6 is provided with a shoulder portion 12—8 which is engaged with the inwardly facing surface portion of the wall member 31—6 for holding the assembled push-pull transducer structure in their proper position within the casing.

The aligning shell 12—7 of the outer core structure is provided with a circular row of acoustic apertures 21—8, the apertures being of circular or arcuate shape so that sound generated by the vibration of the diaphragm is propagated from the circular acoustic space 21—7 extending along the outer peripheral surface of the diaphragm, by way of the apertures 21—8 and the outer acoustic space 28—6 underlying the cover wall toward the sound passage 32—6, or for propagating sound in the opposite direction toward the diaphragm when the device is used as a microphone.

The outer pole member 18 of each core structure embodies permanently magnetized elements and is polarized in the manner indicated diagrammatically in Fig. 19 so that juxtaposed pole faces of the two core structures are of opposite polarity. This is also indicated in Fig. 19 by the heavy dash-line arrow indicating the direction of the permanent magnet flux induced in the juxtaposed central pole members 17 of the two core structures. The windings of the two core structures are so connected that an alternating current through the windings produces in juxtaposed pole members oppositely directed fluxes in the manner indicated by the dash-dot flux force lines shown in Fig. 19. In other words, the windings of the two coils 20 are so connected that an alternating current traversing the two windings results in alternating fluxes which produce a corresponding vibratory motion of the diaphragm, and that a vibratory motion imparted to the diaphragm induces alternating current fluxes which produce a corresponding voltage in the two windings.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In an insert earphone suitable for wear in the ear of the user: a circular vibratory diaphragm having a central concentric circular magnetic armature portion; a driving structure comprising a circular magnetic system having a permanently magnetized element for exerting magnetic forces on the inner side of the central armature portion including a circular central pole member and a permanently magnetized circular outer pole member constituting the sole permanently magnetized element thereof and surrounding a major part of said central pole member and radially spaced therefrom by a circular coil space, an outer wall having a sound outlet and forming with the outer side of the diaphragm a circular acoustic transmitting space, circular energizing windings confined in said coil space and surrounding the central pole member for producing audio-frequency vibrations of said diaphragm, and a circular aligning member holding said magnetic system, said diaphragm and said outer wall in their operative positions and having a continuous circular concentric seating ridge, and the periphery of said diaphragm being held on said seating ridge by said magnetic forces; said circular elements of said magnetic system and said driving structure being all substantially concentrically and coaxially aligned with said diaphragm and said transmitting space, and said two pole members having two substantially concentric circular pole areas spaced by gaps from said armature; the axial length of said magnetic system being less than three halves of the axial length of the outer pole member and the entire earphone structure being small enough for inconspicuous wear in the ear of the user; parts of said driving structure constituting a substantially circular wall portion radially spaced from said outer pole member and bounding therewith a substantially circular acoustic compartment coupled to the circular inner peripheral region of said diaphragm for controlling the frequency of the sound output.

2. In an insert earphone suitable for wear in the ear of the user: a circular vibratory diaphragm having a central concentric circular magnetic armature portion; a driving structure comprising a circular magnetic system having a permanently magnetized element for exerting magnetic forces on the inner side of the central armature portion including a circular central pole member and a permanently magnetized circular outer pole member constituting the sole permanently magnetized element thereof and surrounding a major part of said central pole member and radially spaced therefrom by a circular coil space, an outer wall having a sound outlet and forming with the outer side of the diaphragm a circular acoustic transmitting space, circular energizing windings confined in said coil space and surrounding the central pole member for producing audio-frequency vibrations of said diaphragm, and a circular aligning member holding said magnetic system, said diaphragm and said outer wall in their operative positions and having a continuous circular concentric seating ridge, and the periphery of said diaphragm being held on said seating ridge by said magnetic forces; said circular elements of said magnetic system and said driving structure being all substantially concentrically and coaxially aligned with said diaphragm and said transmitting space, and said two pole members having two substantially concentric circular pole areas spaced by gaps from said armature; the axial length of said magnetic system being less than three halves of the axial length of the outer pole member and the entire earphone structure being small enough for inconspicuous wear in the ear of the user; parts of said driving structure constituting a substantially circular wall portion radially spaced from said circular acoustic compartment coupled to the circular inner peripheral region of said diaphragm for controlling the frequency response of the sound output, said aligning member being of metal and having a circular wall portion bounding with the outer pole member the circular acoustic compartment coupled to the peripheral region of the diaphragm.

3. In an insert earphone, suitable for wear in the ear of the user: a circular vibratory diaphragm having a central concentric circular magnetic armature portion; a driving structure comprising a circular magnetic system having a permanently magnetized element for exerting magnetic forces on the inner side of the central armature portion including a circular central pole member and a permanently magnetized circular outer pole member constituting the sole permanetly magnetized element thereof and surrounding a major part of said central pole member and radially spaced therefrom by a circular coil space, an outer wall having a sound outlet and forming with the outer side of the diaphragm a circular acoustic transmitting space, circular energizing windings confined in said coil space and surrounding the central pole member for producing audio-frequency vibrations of said diaphragm, and a circular aligning member holding said magnetic system, said diaphragm and said outer wall in their operative positions and having a continuous circular concentric seating ridge, and the periphery of said diaphragm being held on said seating ridge by said magnetic forces; said circular elements of said magnetic system and said driving structure being all substantially concentrically and coaxially aligned with said diaphragm and said transmitting space, and said two pole members having two substantially concentric circular pole areas spaced by gaps from said armature; the axial length of said magnetic system being less than three halves of the axial length of the outer pole member and the entire earphone structure being small enough for inconspicuous wear in the ear of the user; parts of said driving structure constituting a substantially circular wall portion radially spaced from said circular acoustic compartment coupled to the circular inner peripheral region of said diaphragm for controlling the frequency response of the sound output, the structure of said aligning member forming with other elements of the driving structure an acoustic seal around all interior space coupled to the inner side of the diaphragm.

HARRY A. PEARSON.

REFERENCES CITED

The following references are of record in the file of this patent:

UNITED STATES PATENTS

| Number | Name | Date |
|---|---|---|
| 1,026,196 | Beck | May 14, 1912 |
| 1,180,462 | Willis | Apr. 25, 1916 |
| 1,194,457 | Willis | Aug. 15, 1916 |
| 1,559,597 | Williams | Nov. 3, 1925 |
| 1,703,926 | Delano | Mar. 5, 1929 |
| 1,854,802 | Meyer | Apr. 19, 1932 |
| 1,854,812 | Steinberg | Apr. 19, 1932 |
| 2,078,385 | Kato | Apr. 27, 1937 |
| 2,249,158 | Morrison | July 15, 1941 |
| 2,249,160 | Mott | July 15, 1941 |
| 2,298,764 | Horlacher | Oct. 13, 1942 |
| 2,360,796 | Roberton | Oct. 17, 1944 |
| 2,449,557 | Knauert | Sept. 21, 1948 |

FOREIGN PATENTS

| Number | Country | Date |
|---|---|---|
| 105,547 | Austria | Feb. 10, 1927 |
| 401,510 | Great Britain | Nov. 16, 1933 |
| 410,491 | Great Britain | May 16, 1934 |
| 471,893 | Germany | Feb. 16, 1929 |